US 8,998,037 B2

(12) United States Patent
Cahen et al.

(10) Patent No.: US 8,998,037 B2
(45) Date of Patent: Apr. 7, 2015

(54) DRINK DISPENSING DEVICE WITH HOLDING AND DRIP-COLLECTING SYSTEM FOR RECEPTACLES OF DIFFERENT SIZES

(75) Inventors: Antoine Cahen, Lausanne (CH); Philippe Cahen, Lausanne (CH); Christophe S. Boussemart, Lugrin (FR)

(73) Assignee: Nestec S.A., Vevey (CH)

( * ) Notice: Subject to any disclaimer, the term of this patent is extended or adjusted under 35 U.S.C. 154(b) by 131 days.

(21) Appl. No.: 13/177,123

(22) Filed: Jul. 6, 2011

(65) Prior Publication Data

US 2011/0259202 A1    Oct. 27, 2011

Related U.S. Application Data

(62) Division of application No. 11/764,503, filed on Jun. 18, 2007, now Pat. No. 8,002,146.

(30) Foreign Application Priority Data

Jun. 16, 2006 (EP) ..................................... 06115568

(51) Int. Cl.
*B67D 7/84* (2010.01)
*A47J 31/44* (2006.01)

(52) U.S. Cl.
CPC .................................. *A47J 31/4482* (2013.01)

(58) Field of Classification Search
CPC .................................................. A47J 31/4482
USPC .................... 99/275, 317; 222/108, 173, 220; 248/146; 141/86–89
See application file for complete search history.

(56) References Cited

U.S. PATENT DOCUMENTS

| 145,653 | A | * | 12/1873 | Hitchcock | 222/108 |
| 1,256,206 | A | | 2/1918 | Cordley | 222/108 |
| 2,834,516 | A | * | 5/1958 | Mosher | 222/108 |
| 4,253,385 | A | | 3/1981 | Illy | |
| 4,353,293 | A | | 10/1982 | Illy | |
| 4,377,049 | A | | 3/1983 | Simon et al. | |
| 4,458,735 | A | | 7/1984 | Houman | |
| 4,554,419 | A | | 11/1985 | King et al. | |

(Continued)

FOREIGN PATENT DOCUMENTS

| CH | 487 636 A | 3/1970 |
| CH | 682798 A5 | 11/1993 |

(Continued)

OTHER PUBLICATIONS

Non-Final Office Action U.S. Appl. No. 13/061,092 dated Feb. 15, 2013.

(Continued)

*Primary Examiner* — Jianying Atkisson
(74) *Attorney, Agent, or Firm* — Winston & Strawn LLP

(57) ABSTRACT

A drink preparing device that includes a box and a holding and drip-collecting system that comprises a holding part positionable beneath a drink outlet in order to accept a first, relatively small receptacle, and being configured and dimensioned to be moveable between a deployed holding position suitable for accepting the small receptacle and a second position in which the part is moved at least partly out of the way of the drink outlet to create an unoccupied space in which a second, larger receptacle can be positioned, in place of the first receptacle, beneath the drink outlet.

17 Claims, 3 Drawing Sheets

(56) References Cited

U.S. PATENT DOCUMENTS

| | | |
|---|---|---|
| 4,687,119 A | 8/1987 | Juillet ............................ 221/101 |
| 4,767,632 A | 8/1988 | Meier |
| 4,954,697 A | 9/1990 | Kokubun et al. |
| 5,161,455 A * | 11/1992 | Anson et al. ...................... 99/280 |
| 5,167,392 A | 12/1992 | Henricksen ................ 248/311.2 |
| 5,285,989 A * | 2/1994 | Zilbert et al. .................. 248/146 |
| 5,312,020 A | 5/1994 | Frei |
| 5,335,705 A | 8/1994 | Morishita et al. |
| 5,353,692 A | 10/1994 | Reese et al. ...................... 99/289 |
| 5,372,061 A | 12/1994 | Albert et al. |
| 5,375,508 A | 12/1994 | Knepler et al. |
| 5,645,230 A | 7/1997 | Marogna et al. |
| 5,731,981 A | 3/1998 | Simard |
| 5,836,236 A | 11/1998 | Rolfes et al. |
| 5,927,553 A | 7/1999 | Ford |
| 5,959,869 A | 9/1999 | Miller et al. |
| 6,139,888 A | 10/2000 | Knepler |
| 6,182,555 B1 | 2/2001 | Scheer et al. |
| 6,238,721 B1 | 5/2001 | Knepler |
| 6,354,341 B1 | 3/2002 | Saveliev et al. |
| 6,465,035 B1 | 10/2002 | Knepler |
| 6,619,607 B2 | 9/2003 | Yamada ...................... 248/311.2 |
| 6,696,676 B1 | 2/2004 | Graves et al. |
| 6,759,072 B1 | 7/2004 | Gutwein et al. |
| 7,028,603 B1 | 4/2006 | Gremillion et al. |
| 7,270,050 B2 | 9/2007 | Glucksman et al. |
| 7,279,660 B2 | 10/2007 | Long et al. |
| 7,300,031 B2 * | 11/2007 | Bertsch et al. ............. 248/311.2 |
| 7,350,455 B2 | 4/2008 | Vetterli |
| 8,002,146 B2 | 8/2011 | Cahen et al. |
| 2002/0131324 A1 | 9/2002 | Farell |
| 2003/0015953 A1 | 1/2003 | Taguchi et al. |
| 2005/0016385 A1 | 1/2005 | Brinkemper et al. |
| 2005/0073823 A1 | 4/2005 | Engelmann et al. |
| 2006/0219102 A1 | 10/2006 | Geroult et al. |
| 2007/0157820 A1 | 7/2007 | Bunn |
| 2008/0148950 A1 | 6/2008 | Cahen et al. |
| 2008/0199580 A1 | 8/2008 | Accumanno et al. |
| 2009/0303695 A1 | 12/2009 | Buchstab et al. |
| 2011/0162531 A1 | 7/2011 | Lang et al. |
| 2011/0168026 A1 | 7/2011 | Cahen et al. |
| 2011/0259202 A1 | 10/2011 | Cahen et al. |

FOREIGN PATENT DOCUMENTS

| | | |
|---|---|---|
| CN | 2371917 Y | 4/2000 |
| CN | 2595026 | 12/2003 |
| CN | 2730271 Y | 10/2005 |
| CN | 1698505 A | 11/2005 |
| CN | 2783915 Y | 5/2006 |
| CN | 2889095 Y | 4/2007 |
| CN | 101232829 A | 7/2008 |
| DE | 2019445 A1 | 11/1971 |
| DE | 4429353 A1 | 2/1996 |
| DE | 19647039 C2 | 3/2000 |
| DE | 20200419 U1 | 7/2002 |
| DE | 202005002814 U1 | 6/2005 |
| DE | 20 2004 020 983 U1 | 7/2006 |
| DE | 202006019039 U1 | 3/2007 |
| DE | 102005057166A1 A1 | 5/2007 |
| EP | 0 549 887 A2 | 7/1993 |
| EP | 549887 A2 * | 7/1993 |
| EP | 1208782 B1 | 8/2004 |
| EP | 1448084 B1 | 8/2004 |
| EP | 1676509 A1 | 7/2006 |
| EP | 1707088 B1 | 10/2006 |
| FR | 2624844 A1 | 6/1989 |
| FR | 285716 A1 | 2/2005 |
| FR | 2868713A1 A1 | 2/2005 |
| GB | 847662 A | 9/1960 |
| GB | 2240206 | 7/1991 |
| GB | 2397510 A | 7/2004 |
| JP | S5722724 A | 2/1982 |
| JP | 57-129527 A | 8/1982 |
| JP | 59-045043 A | 3/1984 |
| JP | 62-018027 U | 1/1987 |
| JP | 62-41620 A | 2/1987 |
| JP | 08140836 A2 | 6/1996 |
| JP | 08263734 A2 | 10/1996 |
| JP | 3041974 U | 7/1997 |
| JP | 2002328772 A | 11/2002 |
| JP | 2003031154 A | 1/2003 |
| JP | 2003299573 A | 10/2003 |
| JP | 2004087250 A | 3/2004 |
| JP | 2004298418 A2 | 10/2004 |
| JP | 2005063962 A | 3/2005 |
| JP | 2006153422 A2 | 6/2006 |
| JP | 2007255783 A2 | 10/2007 |
| WO | WO9725634 A1 | 7/1997 |
| WO | WO9950172 A1 | 10/1999 |
| WO | WO03037151A1 A1 | 5/2003 |
| WO | WO03039309 A1 | 5/2003 |
| WO | WO 2004/023950 A1 | 3/2004 |
| WO | WO2004030435 A2 | 4/2004 |
| WO | WO2004030438 A2 | 4/2004 |
| WO | WO2005060801 A1 | 7/2005 |
| WO | WO2006005756 A1 | 1/2006 |
| WO | WO2006063645 A1 | 6/2006 |
| WO | WO2006082064 A1 | 8/2006 |
| WO | WO2006090183 A2 | 8/2006 |
| WO | WO2006104575 A1 | 10/2006 |
| WO | WO2006124542 A2 | 11/2006 |
| WO | WO2007003062 A1 | 1/2007 |
| WO | WO2007003990 A2 | 1/2007 |
| WO | WO2008104751 A1 | 9/2008 |
| WO | WO2008138710 A1 | 11/2008 |
| WO | WO2008138820 A1 | 11/2008 |
| WO | WO2009043630 A2 | 4/2009 |
| WO | WO2010037806 A1 | 4/2010 |
| WO | WO2010046442 A1 | 4/2010 |

OTHER PUBLICATIONS

Final Office Action U.S. Appl. No. 13/061,092 dated Aug. 7, 2013.
Non-Final Office Action U.S. Appl. No. 13/062,935, Aug. 20, 2013.
Restriction Requirement U.S. Appl. No. 13/062,935, Jun. 7, 2013.
Final Office Action U.S. Appl. No. 13/062,935 dated Jan. 22, 2014.
International Search Report, PCT/EP2009/063896, mailed Jan. 29, 2010.
International Search Report, PCT/EP2009/062741, mailed Feb. 8, 2010.
International Search Report PCT/EP2009/053139 mailed Jul. 20, 2009.

* cited by examiner

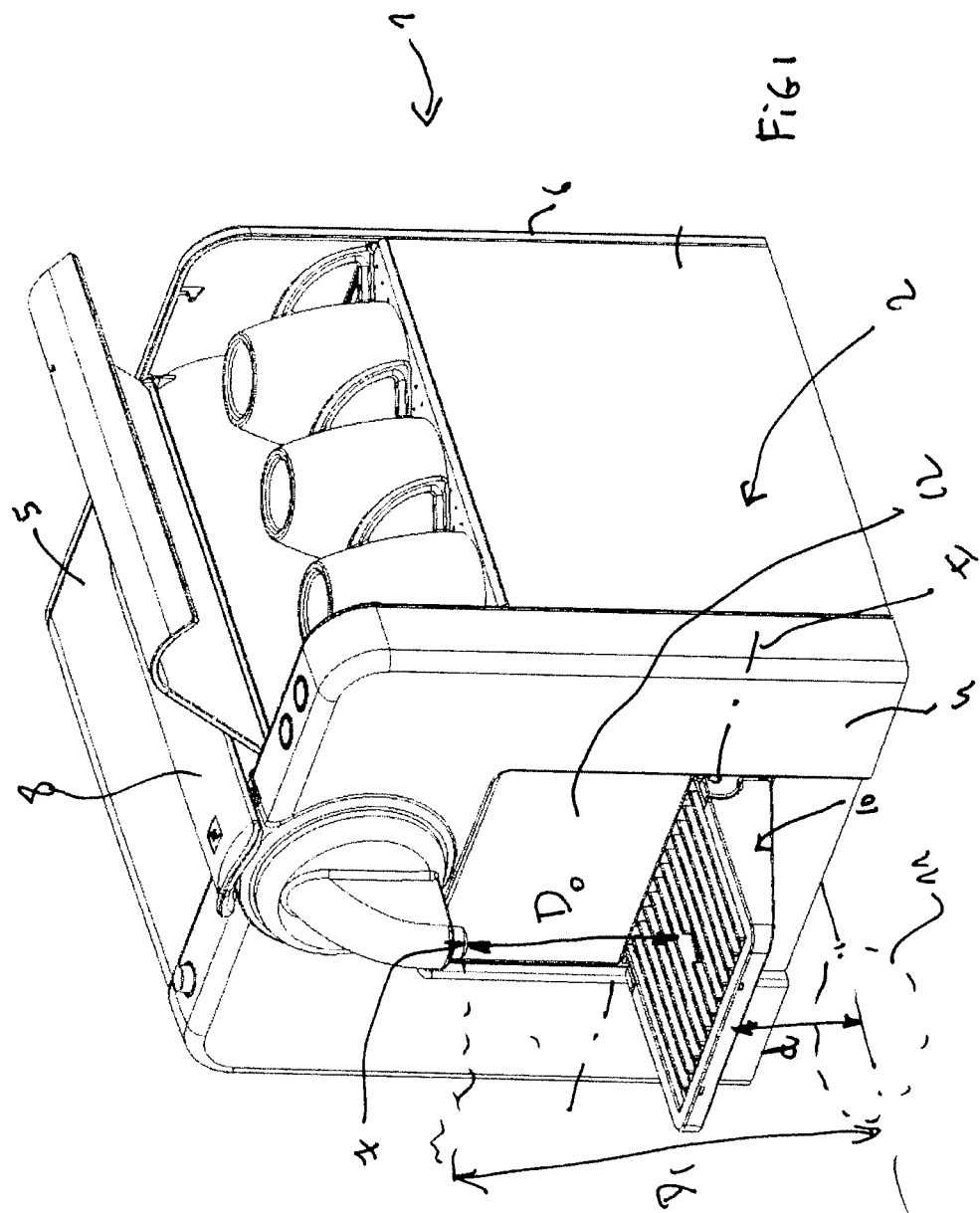

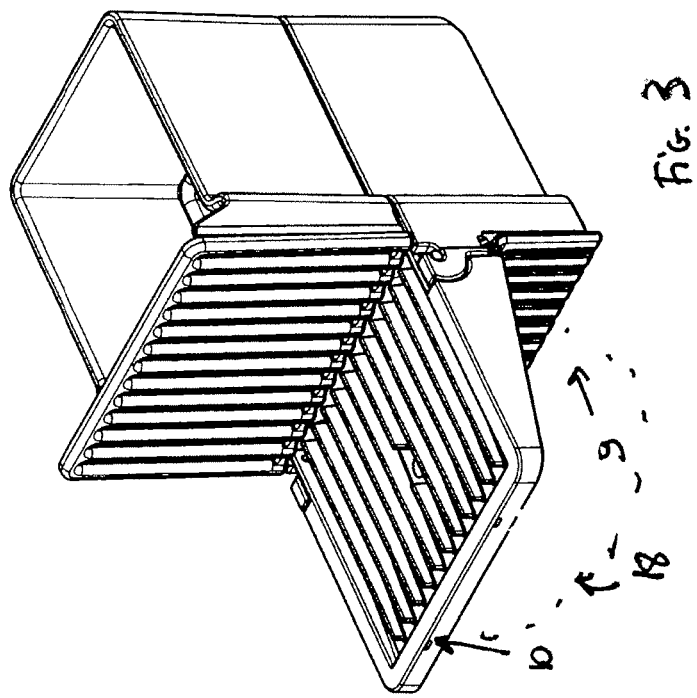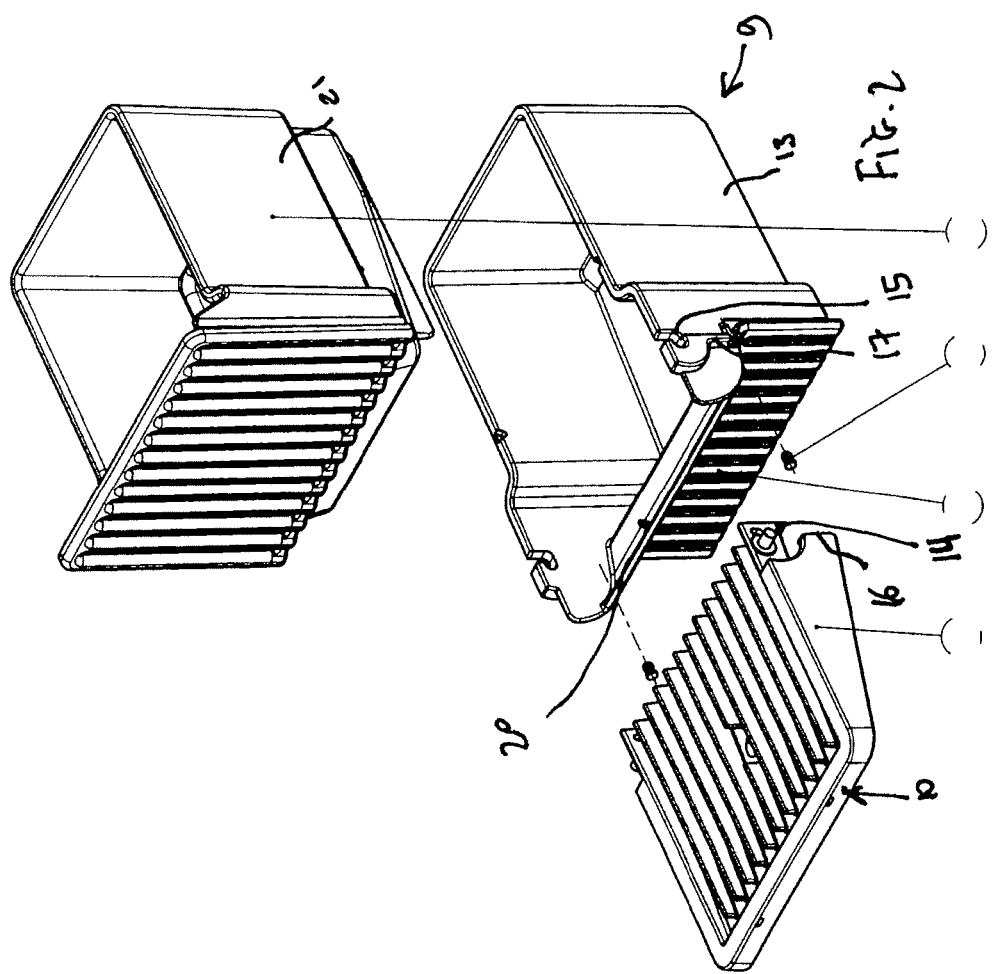

DRINK DISPENSING DEVICE WITH HOLDING AND DRIP-COLLECTING SYSTEM FOR RECEPTACLES OF DIFFERENT SIZES

CROSS-REFERENCE TO RELATED APPLICATIONS

This application is a division of application Ser. No. 11/764,503 filed Jun. 18, 2007 now U.S. Pat. No. 8,002,146, the entire content of which is expressly incorporated herein by reference thereto.

BACKGROUND

The present invention relates to a drink dispensing device, such as a coffee machine, having a drip-collecting system suitable for receptacles of different sizes.

There is a consumer demand for drink dispensing machines, such as coffee machines, that can deliver a variety of drinks in receptacles of different sizes. For example, some coffee machines are capable of preparing an espresso coffee or a lungo coffee in a small or medium cup and a "macchiato" coffee in a large glass.

It is also important to maintain a short distance between the drink outlet and the receptacle in order to produce a good quality froth (the "crema") for a coffee, besides avoiding the risk of spatter. What is required, therefore, is a system that will prevent the user from choosing the wrong holder and from setting an incorrect distance between the drink outlet and the receptacle.

Furthermore, it is also important to provide an effective drip-collecting system in order to keep the service area reasonably clean. It is important, too, to provide an easy-to-use system without technical complexity. The system must also be easy to maintain. Existing prior-art devices do not really achieve these desirable features.

Certain devices are made up of several holding parts on top of each other. The user has to manipulate one or more of these parts in order to adapt the holder correctly to the desired receptacle size, and the collected liquid may be spilt. There is also the risk of the user not setting the receptacle at the correct distance from the outlet for the dispensed drink. For example, he may choose to use a holder which is too low for coffee served in a cup. Thus, there is a need for improved devices of these types.

SUMMARY OF THE INVENTION

The present invention now provides a solution that will meet the abovementioned requirements and solve the problems of the prior art. For this purpose, the invention relates to a drink preparing device, such as a coffee machine, that includes a drink outlet. The device comprises a box and a holding and drip-collecting system that comprises a holding part positionable beneath a drink outlet in order to accept a first, relatively small receptacle, and being configured and dimensioned to be moveable between a deployed holding position suitable for accepting the small receptacle and a second position in which the part is moved at least partly out of the way of the drink outlet to create an unoccupied space in which a second, larger receptacle can be positioned, in place of the first receptacle, beneath the drink outlet.

The cup holding part is preferably associated with the box as a cantilever projection when the holder of the first receptacle is in the deployed position. Also, the holding part may be configured and positioned for rotation between the deployed position and the second position. For this, holding part may be hinged about an axis of rotation allowing the part to be moved upwards and out of the way. Alternatively, the holding part may be hinged in such a way that it can be moved at least partly toward the second position during the positioning of the taller receptacle and the cup holder is also configured and dimensioned to fall back by gravity beneath the drink outlet when the user removes the taller receptacle away from the drink outlet.

The system may further comprise a liquid collecting tray arranged to receive liquid collected by the holding part when the holding part is moved to the second position. The holding part and collecting tray may be joined together to form a drawer which is removable from the box. In addition, the device may include a device for locking the holding part in the second position. This locking device may be configured to release the holding part automatically in the second position. Also, the holding part may be locked in the second position in such a way as to fall back under gravity into the deployed position when released by the locking device. Preferably, the locking means includes an on/off means.

If desired, the holding part may be movable along or into a housing in the base. When intended, the device may further comprise a housing into which the holding part is inserted by a sliding action.

BRIEF DESCRIPTION OF THE DRAWING FIGURES

FIG. 1 is a perspective view of a device according to the invention;

FIG. 2 shows a detail of the holding and collecting system according to the invention, in an exploded view;

FIG. 3 shows a detail of the holding and collecting system according to the invention, assembled in drawer form;

DETAILED DESCRIPTION OF THE PREFERRED EMBODIMENTS

Figure 4:
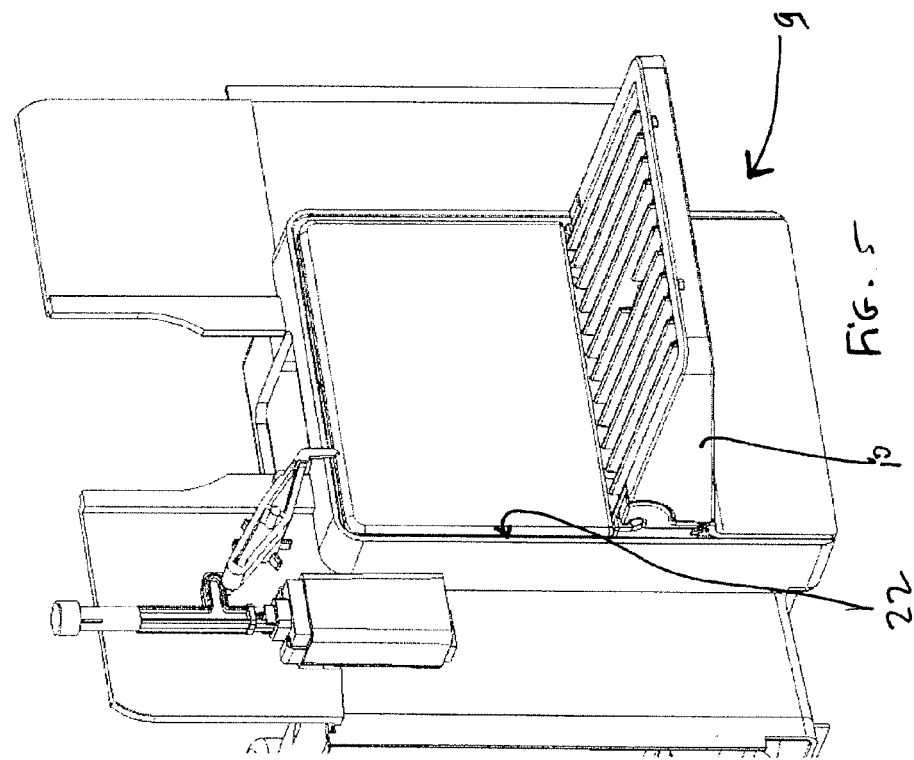
FIG. 4 is a detail perspective view of part of the device in which the holding and drip-collecting system is in the locked position.

As noted above, in a preferred embodiment, the cup holding part preferably projects cantilever-fashion from the box when the holder of the small receptacle is in the deployed position and is designed to be able to be moved out of the way to create a space in which a larger receptacle can be positioned underneath the drink outlet. Also, the holding part preferably projects cantilever-fashion at a predetermined vertical distance from the lower plane of the box. For example, the distance may be such that a small receptacle cannot move the holding part sufficiently out of the way, whereas a large receptacle is capable of moving said part out of the way.

Thus, in accordance with the inventive concept, the holding and collecting means used for the small receptacle (such as a cup) is moved out of the way simply when a large receptacle is used. It can thus be moved out of the way by the receptacle itself—a large glass, for example. This principle also ensures the ideal distance for delivering the drink because it prevents any confusion in the control of the positioning of the receptacle underneath the drink outlet.

In one possible embodiment, the holding part is rotatable. It is preferably rotated upwards and out of the way by the placement of a receptacle tall enough to push against the holding part and thus keep it out of the way. For example, the holding part may be hinged to the device on an essentially horizontal axis of rotation allowing said part to be moved upwards and out of the way.

The holding part is preferably hinged to the device in such a way that it can be moved at least partly out of the way during the positioning of a larger receptacle and can fall back under gravity underneath the drink outlet when the user removes said receptacle. The last few drips falling from the drink outlet can thus be collected by the holding part itself when the user removes the large receptacle from the service area.

In accordance with another possible aspect, the system comprises a liquid collecting tray arranged to receive liquid collected by the holding part at the moment when the latter is moved out of the way. The holding part can thus be emptied at regular intervals, thus reducing the risk of liquid overflow, improving the cleanliness of the device and reducing hygiene problems.

In a preferred construction, the holding part and the collecting tray are joined together to form a drawer which is removable from the box. In this form, the holding part can be hinged removeably to the collecting tray itself or to any other component connected to the drawer. This modular drawer concept makes for easier maintenance and allows cleaning of the whole of the holding and collecting system.

The device of the invention may also comprise a device for locking the holding part in its fully out-of-the-way position. The locking device may be designed to release the holding part automatically in the deployed position. When the locking device is released, the holding part can drop back, for example, under gravity to the deployed position. Locking may be useful particularly when carrying out maintenance and/or when the device is not in use, so that it takes up less space. The return of the holding part to its position may be automatic, in the sense of not requiring the user to manipulate the holder itself. This would reduce the risk of the user trying to use a small receptacle when the part is still locked in the raised or out-of-the-way position.

In a preferred embodiment, the locking means are controlled by the "on/off" power supply means of the device. More specifically, when the device is turned on by using the on button, the pressure on the button unlocks the locking means. The control of the locking means by the button may be mechanical, electromagnetic and/or electrical in nature for example.

The invention is not necessarily limited to a holding part designed to rotate. Another possible embodiment is one in which the part is moved out of the way by other means such as by sliding it in the manner of a drawer into a housing inside the device.

With reference to the drawing figures, the drink preparing device bears the reference 1 and will be referred to simply as a "coffee machine" in the remainder of the description. The coffee machine according to the invention comprises a box 2 which will cover various assembled parts such as an internal frame 3 (illustrated in FIGS. 2-3) to which various external panels 4, 5, 6 are fitted. The machine comprises a drink outlet 7 which may take various forms. The machine may also include, for example, means 8 for closing the brewing or percolation module.

Since the brewing or dilution technique is not the subject of the invention, it is not necessary to describe it. As an example, the machine may comprise internally a brewing module for brewing, dissolving and/or diluting the ingredient under pressure and delivering it through the drink outlet. The ingredient is preferably contained in a closed package such as a capsule, a sachet or any other package suitable for the machine.

The device according to the invention comprises a system 9 for holding the receptacle and collecting drips. The system is formed by a holding part 10 which goes underneath the drink outlet and projects cantilever-fashion from the machine. "Projects cantilever-fashion" means that the holding part continues from the device in at least one direction and is not supported from beneath, thus forming a sort of balcony. The holding part is placed at a predefined distance D from the drink outlet for the optimum drip distance when accepting small or medium-size receptacles (meaning, for example, cups capable of holding approximately 25, 40 or 110 mL respectively). The part is thus at a distance "d" from the placement surface 11 on which a larger receptacle is placed when the part is moved out of the way by the receptacle. The placement surface or receptacle holder may be virtual, that is, it may simply be the surface of a kitchen table or other surface that is not part of the machine itself, or "real", meaning part of a supporting surface of the machine itself. However, the invention aims to simplify the machine and therefore there is no need to provide a holder specially for the larger receptacle (hereinafter referred to as a "large glass"), as will be explained later.

The holding part 10 is thus freely rotatable about an axis of rotation I relative to the box. The holding part can be raised up out of the way, in which case a large glass can be put in position. The large glass simply pushes the holding part up out of the way. It may be lifted only part of the way so that the holding part is not entirely housed in the housing 12 provided in the box. The drink outlet 7 is also designed such that the distance D1 between the outlet and the placement surface 11 is optimal for a large glass, in order in particular to limit the risk of spatter and give the drip a short path so as not to destroy the layer of foam forming (or already formed) in the glass.

FIGS. 2 and 3 show the holding and collecting system 9 on its own. The system takes the form of a drawer assembly. A first collecting tray 13 is provided to collect liquid from the holding part 10. The holding part is hinged removably onto the side faces of the collecting tray 13 by means of pins 14 which fit into slots 15 in the faces. On the sides of the holding part are bearing surfaces 16 located underneath the axis of rotation in order to bear against the front surfaces 17 of the tray. The holding part is thus supported in a projecting position without occupying a space 18 underneath the part. The holding part is firm and can take a cup of small or medium-size capacity. On the front, the drip tray may have a trough 20 which advances underneath the holding part and assists with liquid collection.

A second collecting tray 21 for coffee capsules can be fitted onto the first collecting tray 13. Once installed in the machine, the tray 21 is designed to collect the used capsules ejected by the brewing module.

The holding and collecting system 9 according to the invention forms a single modular block which can easily be disengaged from the box by simply sliding it out, for example, thereby facilitating maintenance, that is emptying out both liquid and used capsules and cleaning the trays out.

Figure 5:
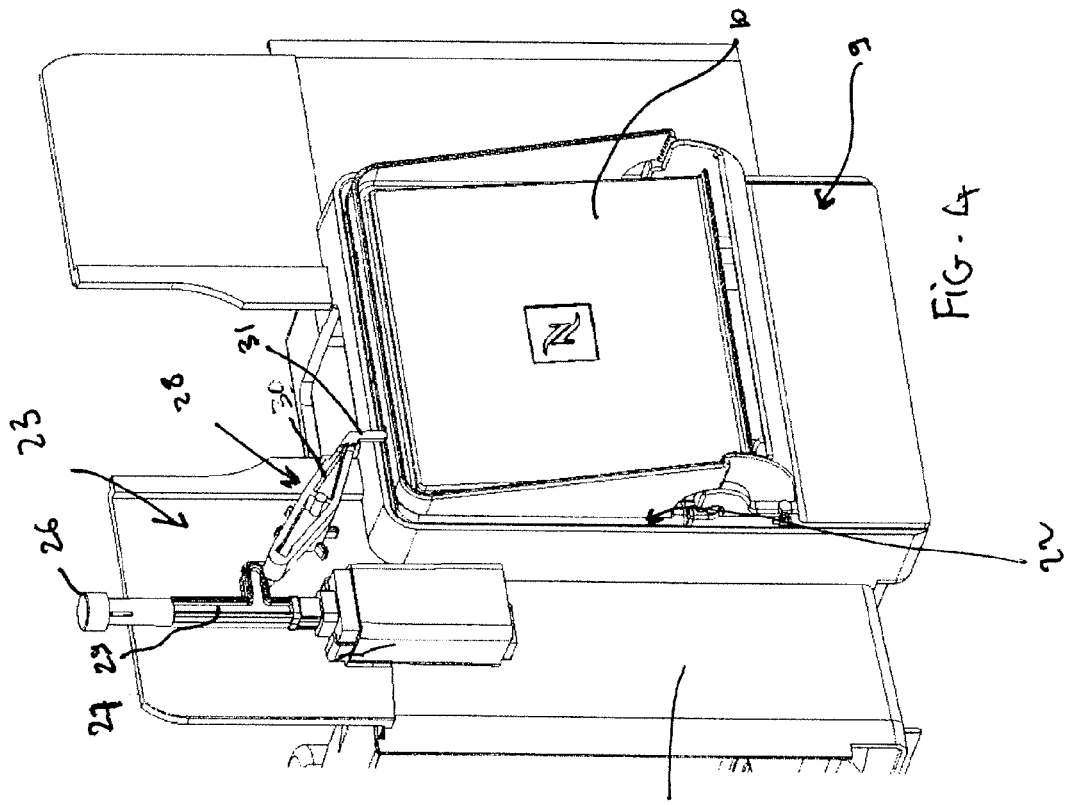
FIG. 5 is a detail view of part of the device with the system deployed to accept small or medium-size receptacles.

As shown in FIGS. 4 and 5, the holding and collecting system 9 engages with a sliding action into a housing 22 in the box of the machine. Once in place, the system is functionally and aesthetically integrated into the rest of the machine.

The machine also preferably comprises a locking device 23 for locking the holding part 10 in a fully retracted or out-of-the-way position, as for example at least partly in the housing 22. Any locking means may be considered, such as mechanical or electromagnetic means. In a preferred embodiment, the locking device comprises locking means connected to a control means. The control means acts on the locking means to release the holding part when desired. The holding part is then released and can rotate into its deployed position (FIG. 5).

The control means preferably includes the machine's on/off button 26 for turning the machine on. This means is, as known per se, connected to an electric switch 27 for powering the electrical and electronic components of the machine (boiler, pump, electronic control, etc.) when desired. In this particular case, the on/off button 26 is connected mechanically to a catch 28 formed, for example, by a mechanical pusher 29 that activates a rocker 30 connected to a retention pin 31 acting to retain the front edge of the holding part 10. The rocker part 30 may be provided with elastic means (such as a spring) for the automatic return of the pin to the locked position following removal of the pressure from the on/off button as shown in FIG. 5.

The advantage of connecting the locking of the holding part in the retracted position to the on/off control is that it avoids the situation in which the user is able to prepare a drink in a small container even though the holding part is in the locked position. When the user wishes to make a drink of coffee in a cup, for example, as opposed to in a large glass, he must first press the on/off button, which opens the lock and releases the holding part. On the other hand, if he wishes to make a drink in a large glass, he has simply to push the holding part 10 out of the way with an upward rotation using the large glass.

What is claimed is:

1. A drink preparing device placeable onto a supporting or placement surface, such as a device comprising a box that covers at least an internal frame to which one or more panels are fitted, and a holding and drip-collecting system that comprises a holding part positionable underneath a drink outlet protruding from one panel in order to accept a first, relatively small receptacle, the holding part being hinged to the box so that it is rotatably moveable between a relatively horizontal deployed holding position suitable for accepting the first receptacle beneath the drink outlet and upward to a relatively vertical retracted position in which the holding part is moved at least partly out of the way of the drink outlet to create a delimited unoccupied space in which a second, relatively larger receptacle can be positioned, in place of the first receptacle, underneath the drink outlet, wherein the holding part is associated with the box as a cantilever projection for supporting the first receptacle when in the deployed position wherein the free end of the cantilever projection cannot move downwardly below the deployed position, and is freely moveable from the deployed position to the retracted position to raise the free end of the holding part upwardly in order to allow the second receptacle to be placed under the outlet, and thereafter is freely rotatable from the retracted position back to the deployed position under gravity, wherein the upper boundary of the unoccupied spaced is defined by the vertical position of the drink outlet relative to the supporting or placement surface, and the lower boundary of the unoccupied space is defined by the supporting or placement surface, with the distance between the drink outlet and the supporting or placement surface being greater than the height of the second receptacle, and wherein the second receptacle has a height that is greater than that of the first receptacle.

2. Device according to claim 1, wherein the deployed position of the holding part for the positioning of the larger receptacle is outside the box. deployed position and the out-of-the-way position.

3. Device according to claim 1, wherein the holding part comprises a bearing surface for bearing the holding part in the deployed position.

4. A device according to claim 1, wherein the holding part is hinged in such a way that it can be moved at least partly out of the way of the drink outlet during the positioning of the second receptacle and can fall back under gravity underneath the drink outlet when the user removes said second receptacle.

5. A device according to claim 1, wherein the holding part, when deployed, is arranged to collect liquid.

6. A device according to claim 5, wherein liquid collected by the holding part is delivered to the holding and drip-collecting system, and the wherein the holding and drip-collecting system comprises a liquid collecting tray provided in the box and arranged to receive the collected liquid upon movement of the holding part to the retracted position.

7. A drink preparing device placeable onto a supporting or placement surface, such device comprising a box that covers at least an internal frame to which one or more panels are fitted, and a holding and drip-collecting system associated with the internal frame comprising a holding part positionable underneath a drink outlet protruding from one panel in order to accept a first, relatively smaller receptacle, the holding part being moveable between a deployed holding position beneath the drink outlet where it is arranged to collect liquid and is suitable for accepting the first receptacle, and a retracted position in which the holding part is moved at least partly out of the way of the drink outlet, to create an unoccupied space in which a second, relatively larger receptacle can be positioned, in place of the first receptacle, underneath the drink outlet, wherein the second receptacle has a height that is greater than that of the first receptacle, and a liquid collecting tray arranged to receive liquid collected by the holding part when the holding part is moved out of the deployed holding position, and wherein the holding part and the collecting tray are joined together to form a drawer which is removable from the box.

8. A device according to claim 1, wherein movement of the holding part to a position in which the holding part is moved fully out of the way of the drink outlet creates an unoccupied space for the second receptacle, and the device further comprises a device for locking the holding part in its fully out-of-the-way position.

9. A device according to claim 8, wherein the locking device is designed to release the holding part automatically in the deployed position.

10. A device according to claim 9, wherein the holding part is locked in the fully out-of-the-way position in such a way as to fall back under gravity into the deployed position when released by the locking device.

11. A device according to claim 9, wherein the locking device is controlled by an on/off means.

12. A device according to claim 1, which comprises the housing into which the holding part is inserted by a sliding action.

13. A drink preparing device placeable onto a supporting or placement surface, such device comprising a box that covers at least an internal frame and a holding and drip-collecting system associated with the internal frame comprising a holding part positionable underneath a drink outlet in order to accept a first, relatively smaller receptacle, the holding part being moveable between a deployed holding position suitable for accepting the first receptacle beneath the drink outlet and a retracted position in which the holding part is moved at least partly out of the way of the drink outlet, to create an unoccupied space in which a second, relatively larger receptacle can be positioned, in place of the first receptacle, underneath the drink outlet, wherein the second receptacle has a height that is greater than that of the first receptacle, and a liquid collecting tray arranged to receive liquid from the holding part, wherein the holding part is hingedly connected to the liquid collecting tray, and the collecting tray forms a drawer which is removable from the box.

14. A device according to claim 7, wherein the holding part is hinged in such a way that it can be rotatably moved between the deployed holding position and upward to the retracted position, wherein the deployed holding position is relatively horizontal and the retracted position is relatively vertical.

15. A device according to claim 14, wherein the holding part is freely moveable from the deployed position to the retracted position, and freely rotatable back to the deployed position under gravity.

16. A device according to claim 13, wherein the holding part is hinged in such a way that it can be rotatably moved between the deployed holding position and upward to the retracted position, wherein the deployed holding position is relatively horizontal and the retracted position is relatively vertical.

17. A device according to claim 16, wherein the holding part is freely moveable from the deployed position to the retracted position, and freely rotatable back to the deployed position under gravity.

* * * * *

UNITED STATES PATENT AND TRADEMARK OFFICE
CERTIFICATE OF CORRECTION

PATENT NO.        : 8,998,037 B2  
APPLICATION NO.   : 13/177123  
DATED             : April 7, 2015  
INVENTOR(S)       : Cahen et al.

Page 1 of 1

It is certified that error appears in the above-identified patent and that said Letters Patent is hereby corrected as shown below:

In the Claims,

Column 5:
Line 31 (claim 1, line 2), after "placement surface, such" delete "as a".
Line 36 (claim 1, line 7), before "receptacle," delete "small" and insert -- smaller --.
Line 54 (claim 1, line 25), after "unoccupied" delete "spaced" and insert -- space --.
Line 64 (claim 2, line 1), before "according to claim 1," delete "Device" and insert -- A device --.
Lines 66-67 (claim 2, lines 3-4), after "tacle is outside the box." delete "deployed position and the out-of-the-way position.".

Column 6:
Line 1 (claim 3, line 1), before "according to claim 1," delete "Device" and insert -- A device --.

Signed and Sealed this  
Twenty-first Day of July, 2015

Michelle K. Lee  
*Director of the United States Patent and Trademark Office*